United States Patent Office 3,114,674
Patented Dec. 17, 1963

3,114,674
PROCESS FOR TREATING FATIGUE WITH PHOSPHOCREATININATE
Joseph Nordmann, Paris, France, assignor to Compagnie Française des Matieres Colorantes, Paris, France, a French company
No Drawing. Filed June 14, 1960, Ser. No. 35,884
4 Claims. (Cl. 167—55)

The present invention concerns novel medicines for the treatment of fatigue.

The importance of phosphocreatine or phosphagen in the course of muscular contraction, and particularly of cardiac action, is well known. In man this phosphagen constitutes a form of reserve energy, owing to the linkage rich in energy which its molecule contains. This energy is rapidly and easily utilisable for numerous metabolic reactions, such as muscular contraction, or for numerous synthesis reactions through the recharging of the adenosine diphosphate wtih phosphorylated groups. However, phosphocreatine has not been proposed until now as an antifatigue medicine. Now, it has been found that, administered either as it is or in the form of phosphocreatinine, it makes it possible to combat fatigue with great efficacy; by varying the posology, the source of energy which it requires to reconstitute its metabolic reserves can be placed at the disposal of the organism.

However, fatigue is a syndrome which is characterised by disturbances affecting the organism not only at the muscle level but also at the nervous system level and at the level of general metabolism. It is therefore of interest, and this also forms an object of the invention, to associate phosphocreatine or phosphocreatinine with products acting at the nervous system level or with products acting at the general metabolism level or again with these two sorts of products or with products acting at these two levels. As a product acting against nervous fatigue a salt of an amino-alcohol is preferably used, such as a salt of dimethylcolamine, methylcolamine or colamine. Succinic acid in the form of a salt, such as potassium succinate, can be used, for example, as a product acting at the level of general metabolism. The salt of an amino-alcohol used against nervous fatigue may itself be a succinic acid derivative.

At the level of general metabolism, the succinic ion (in the form, for example, of potassium succinate or the succinate of methylcolamine) plays an important part in reducing fatigue. Its important metabolic turnover makes it an excellent source of metabolites; it is in fact a very important component of the Krebs cycle. This series of reactions represents the essential source of energy used by the organism for all the endergonic processes such as biochemical syntheses or musucular contraction. It may therefore be thought—and the pharmacodynamic experiments of the applicant have demonstrated this to perfection—that the administration of succinate, and more particularly, potassium succinate, by encourging this creation of energy, has an interesting anti-fatigue action.

The potassium cation for its part is essential to cell life and plays an important part in muscular contraction. The state of fatigue is bound up with disturbances in the potassium-sodium ionic equilibrium, the decontraction being related particulariy to the recharging of the muscular fibre with potassium.

Methylcolamine (in the form of methylcolamine succinate, for example), the precursor of choline and an integral part of the choline cycle, reduces nervous fatigue.

Sodium phosphocreatinate and sodium phosphocreatininate have practically no toxicity, either taken orally or by injection. Neutral potassium succinate has a slight toxicity (on adult mice, maximum non-toxic dose of 1 g. per kg. of animal, 50% lethal dose of 2.30 g. per kg.).

The acid succinate of N-methylcolamine has practically no toxicity.

The invention will be more clearly understood by reference to the following examples which are purely illustrative.

*Example 1*

Sodium phosphocreatininate $.5H_2O$ is administered to mice for 14 days at the rate of 500 mgr. per kg. of animal. The phosphocreatininate is dissolved in the drinking water. The animals, weighted with a load of 800 mgr. of lead, are immersed in an annular tank filled with water kept at a constant temperature (24–25° C.); the natural reaction of the animals is to swim until they are exhausted. The swimming time of each of the mice is recorded and their general behaviour is noted. A swimming test made on 51 mice yields an average swimming time of 21 minutes 8 seconds. With non-treated mice the average result is 9 minutes 54 seconds.

*Example 2*

A powder containing 25.42 grs. of sodium phosphocreatinate with four molecules of water of crystallisation, 70.62 gr. of neutral potassium succinate and 4.96 grs. of acid succinate of N-methylcolamine is prepared in a mixer. The mixing is continued with exclusion of moisture until a homogeneous powder is obtained. This powder is divided into cachets, which can be packaged in the dry state, at the rate of 354 mg. per cachet. The cachets are then conditioned and kept free from moisture.

The anti-fatigue action of the constituents of the above powder has been studied on mice using swimming tests according to the method indicated in Example 1. The swimming time of the treated mice is then compared with the swimming time of the control mice. The comparison of the frequency histograms and of the averages of swimming times makes it possible to draw conclusions as to the anti-fatigue properties of the constituents.

*Example 3*

The cachets of Example 2 were administered to subjects affected by various types of fatigue, in particular, subjects affected by post-infectious asthenias and excellent results were obtained.

*Example 4*

A combination of sodium phosphocreatinate, neutral potassium succinate and acid succinate of N-methylcolamine has been tested on emaciated, fatigued or convalescent people who are unfit for regular work. The posology has been at the beginning 40 cg. of sodium phosphocreatinate 100 cg. of potassium succinate and 28 mg. of succinate of N-methylcolamine, per day for 4 days, then a second treatment after a rest of 4 days if a significant result was not obtained at first. The results were mostly sufficiently satisfactory to avoid the necessity of a continuation of the treatment.

In view of the low toxicity of the product, 56 mgr. per day of succinate of N-methylcolamine were even administered in the majority of cases instead of 28.

The tolerance to the different doses used was excellent (25 out of 26). There has not been any troublesome therapeutic incidence on the globular count, but on the contrary, in certain cases a slight increase of the erythrocytes and a tendency to restore the leukocytes figure to normal have been observed.

The clinical results were excellent in the same proportions (25 out of 26). The patients stated that they very quickly felt a sensation of well-being, of relief, and disappearance of their fatigue.

With 12 patients the experimenters have been able to verify a very distanct return of weight. In other respects, the medical treatment in certain cases had a favourable action on hepatic flocculation tests, while the arterial pressure was practically unmodified.

The experimenters have thus been able to declare categorically in favour of the good tolerance and the marked anti-fatigue therapeutic properties of the above composition.

I claim:

1. Process for the treatment of fatigue which comprises orally administering to a human being, phosphocreatinine.

2. Process for the treatment of fatigue which comprises orally administering to a human being a member selected from the group consisting of sodium and potassium phosphocreatininate.

3. Process for the treatment of fatigue which comprises orally administering to a human being sodium phosphocreatininate.

4. Process for the treatment of fatigue which comprises orally administering to a human being from 10 cg. to 5 g. of phosphocreatinine per day.

References Cited in the file of this patent
UNITED STATES PATENTS 2,761,807    Borsook et al. _____ Sept. 4, 1956

OTHER REFERENCES

Mitchell: Text book of Biochemistry, 2nd Ed., McGraw-Hill, OP–514–M5–1950, p. 418.

Geiger: Chem. Abst., vol. 32, p. 3439(s), 1938.

Hawk et al.: Practical Physiological Chemistry, 1947, Blakiston Co., pp. 238–239.

Chang: Chem. Abst., vol. 43, p. 3914(f), 1949. London, 1949, QP–514–S4, p. 3914(f), 1949.

Sexton: Chemical Constitution and Biological Activity, London, 1949, QP–514–S4–1949, p. 63.

Bacher: Chem. Abst. vol. 45, p. 3007(a), 1951.

Yampolskays: Chem. Abst., vol. 46, p. 7194f, 1952.

Dispensatory of U. S., 1955, 25th Ed., p. 1340.

Drug and Cosmetic Industry, 81:5, p. 664, November 1957.

Drug Trade News, 32:25, p. 60, Mfg. Sec., December 16, 1957.

Kleiner: Human Biochemistry, Mosby Co., 5th Ed., 1958, QP–514–K58, p. 436.

Lancet, I, 7032, June 7, 1958.

Pfeiffer: Inter. Rev. Neurobiol., vol. 1, 1959, p. 223.

Pradel: Chem. Abst., vol. 53, p. 18149(a), 1959.